June 29, 1943. G. J. SELLMEYER 2,323,248
PORTABLE POWER DRIVEN SAW
Filed April 15, 1940 3 Sheets-Sheet 1

Inventor
G. J. Sellmeyer
By Kimmel & Crowell
Attorneys

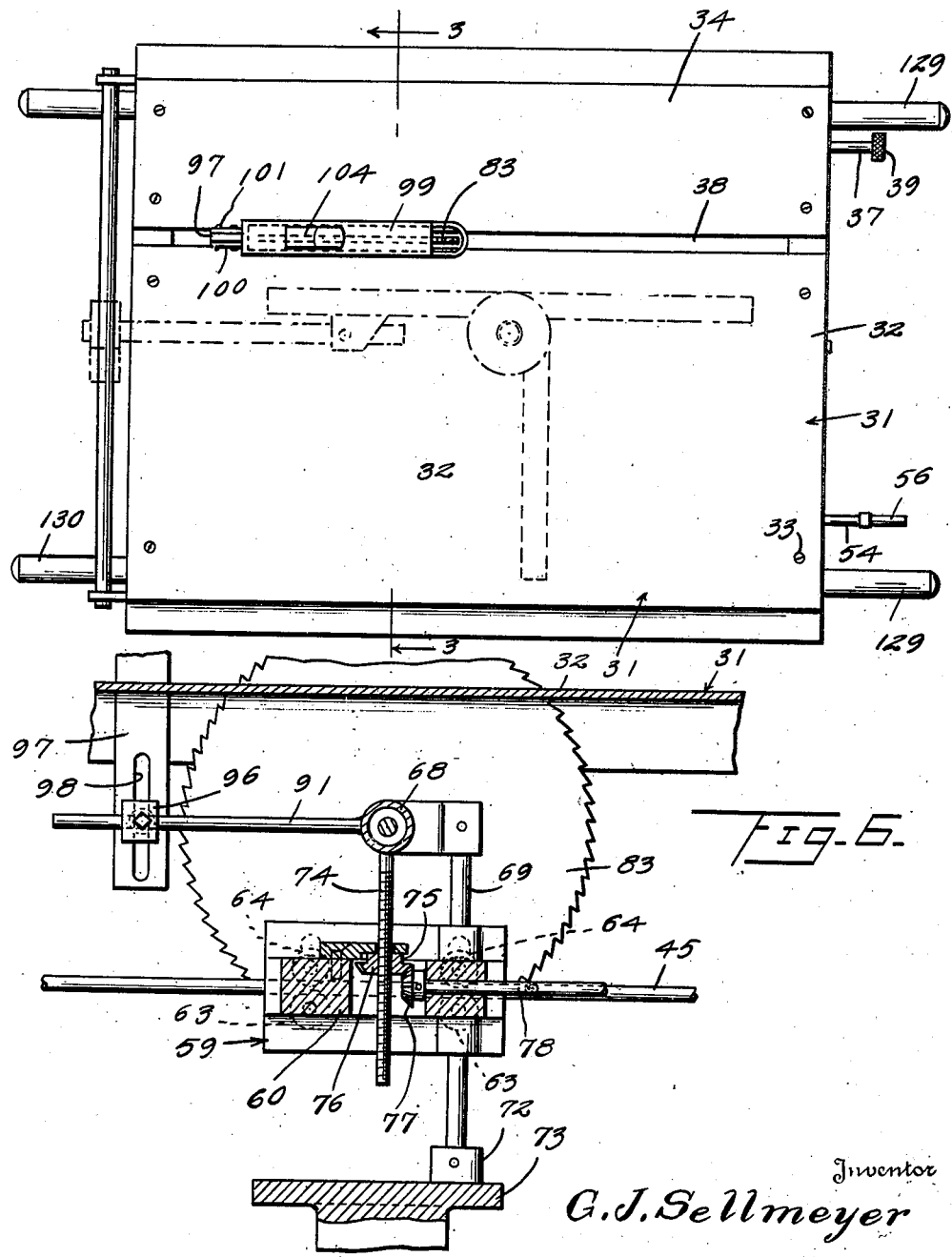

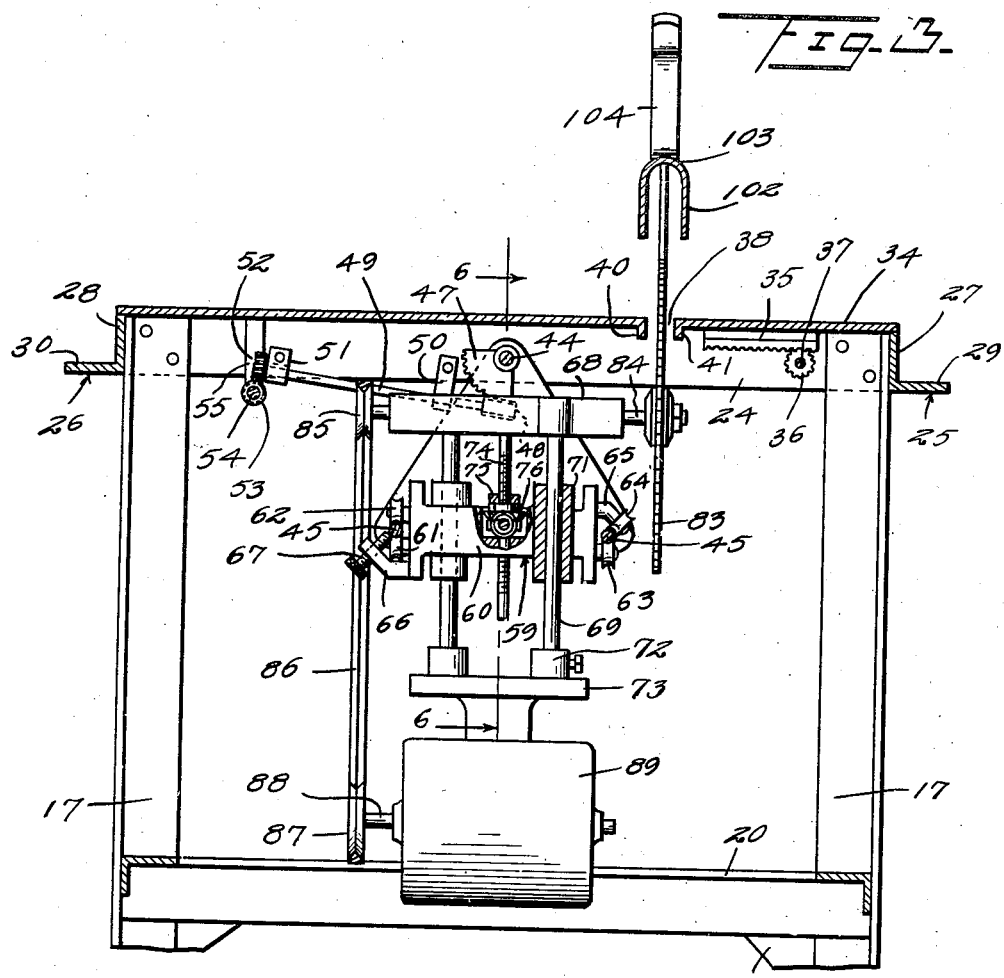
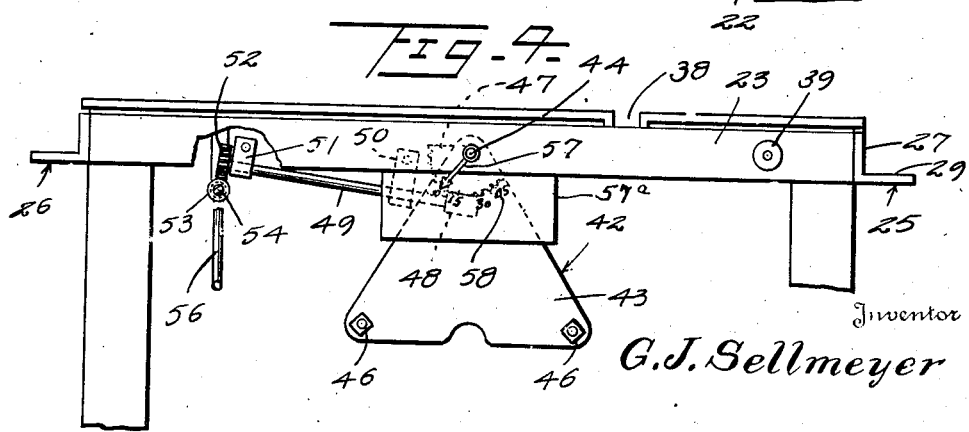

Patented June 29, 1943

2,323,248

UNITED STATES PATENT OFFICE 2,323,248

PORTABLE POWER DRIVEN SAW

Gilbert J. Sellmeyer, Indianapolis, Ind.

Application April 15, 1940, Serial No. 329,776

3 Claims. (Cl. 143—47)

This invention relates to portable saws and is an improvement over the saw structure embodied in my copending application, Serial No. 276,688 filed May 31, 1939, for Portable power driven saws.

An object of this invention is to provide a portable power driven saw which includes a stationary table structure and a saw structure which is movable lengthwise of the table during the rotation thereof so as to cut an article placed on the table.

Another object of this invention is to provide an improved saw structure of this kind wherein the saw may be moved lengthwise of the table and may be adjusted angularly with respect to the table so as to cut a mitre in the piece of work resting on the table.

A still further object of this invention is to provide an improved means whereby a saw supporting carriage may be movably supported beneath a work table and may if desired be adjusted vertically relative to the table so that the saw will cut into the work to the desired depth.

A further object of this invention is to provide in a saw structure of this kind, means whereby one end or edge of the table may be adjusted relative to the remaining portion of the table so as to permit tilting or annular adjustment of the saw relative to the table.

A further object of this invention is to provide an improved means for tilting the saw with respect to the table so as to admit cutting of the wood on the desired angle.

A further object of this invention is to provide an improved carriage and supporting means therefor together with an improved saw spindle and mounting means for the spindle so that the spindle may be vertically adjusted relative to the carriage.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 2 is a top plan of the saw structure.

Figure 3 is a sectional view taken substantially on the line 3—3 of Figure 2.

Figure 4 is a fragmentary front elevation of the frame structure, the carriage for the saw being removed.

Figure 6 is a sectional view taken on the line 6—6 of Figure 3.

Figures 1, 5:
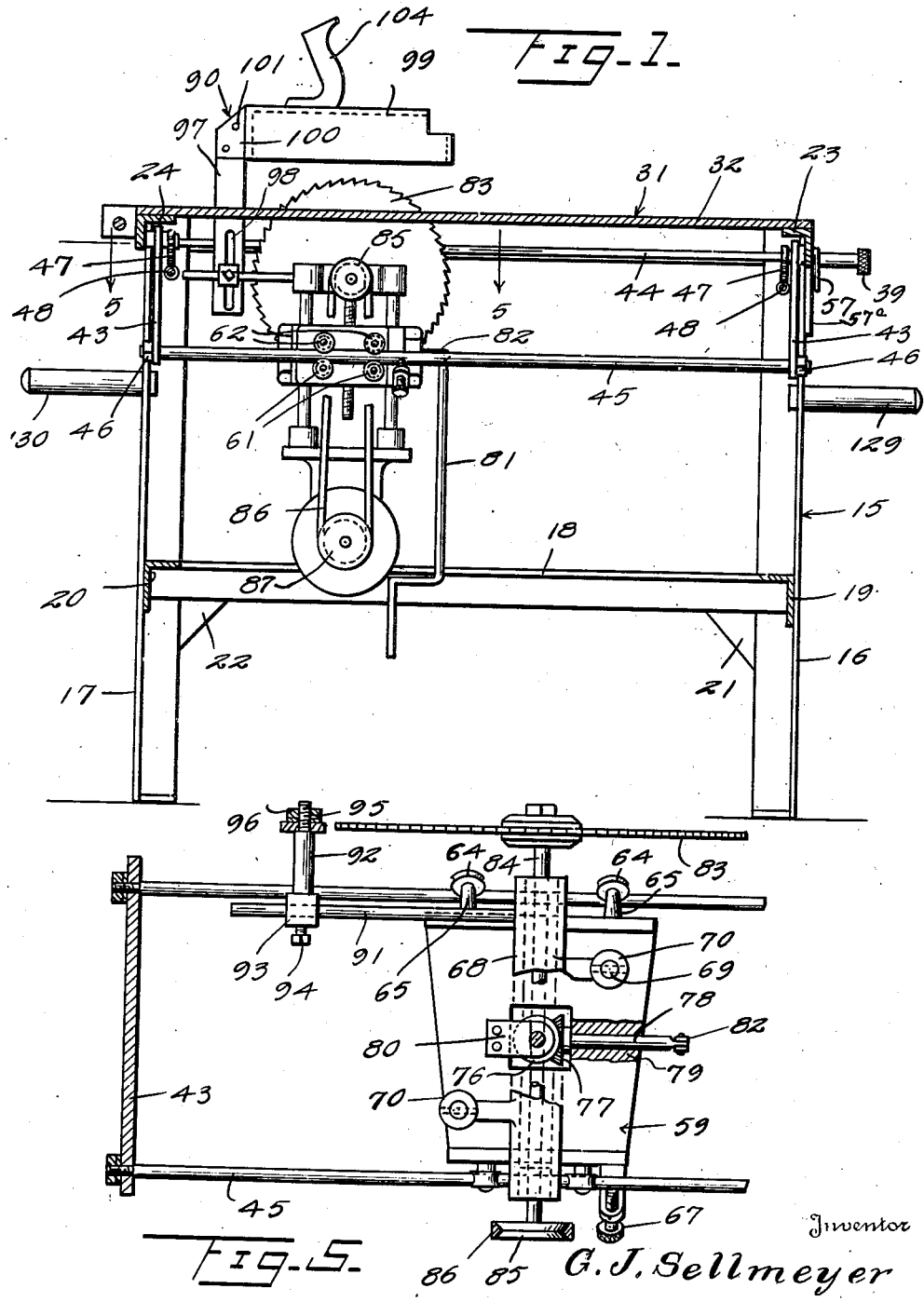
Figure 1 is a vertical section taken longitudinally through a portable power driven saw constructed according to an embodiment of this invention.
Figure 5 is a fragmentary sectional view taken on the line 5—5 of Figure 1.

Referring to the drawings, the numeral 15 designates generally a frame structure including vertical posts 16 and 17 which may be formed of angle members, and the posts 16 and 17 are connected together by side angle members 18. End angle members 19 and 20 connect the pairs of end posts 16 and 17, respectively, together. Bracing webs 21 and 22 may be secured in any desired manner between the side angle members 18 and the end posts 16 and 17, respectively. The forward end posts 16 are secured together by means of an angle member 23 and the rear end posts 17 are secured together by means of an angle member 24. The angle members 23 and 24 may be secured to the posts 16 and 17, respectively, in any suitable manner.

A pair of side angle members 25 and 26 each having one leg 27 and 28, respectively, are disposed in a vertical position and secured to the end posts 16 and 17. See Fig. 3. The other leg 29 and 30 of each of the angle members 25 and 26, respectively, is disposed in a horizontal position and projects laterally of the posts 16 and 17, forming a ledge or supporting means, the purpose for which will be hereinafter described.

A table generally designated as 31 is mounted on top of the frame structure comprising the posts 16 and 17 and the angle members 23 and 24, 25 and 26. The top or table 31 comprises a relatively large plate 32 which is secured as by fastening devices 33 to the angle members 23 and 24, and the top 31 also includes a movable plate or table member 34. See Fig. 2. The movable member 34 on the underside thereof and adjacent each end is provided with a toothed rack 35 (Fig. 3) and a pair of pinions or gears 36 which are carried by a shaft 37 mesh with the teeth of the two racks 35. The table member 34 is slidable relative to the table member 31 so as to form a slot or opening 38 of desired width between the adjacent edges of the table members 32 and 34. An operator 39 in the form of a knob or the like is fixed to the shaft 37 at the forward end of the frame structure and is disposed below the top of the table structure 31. The shaft 37 is journalled through the angle members 23 and 24, and rotation of the shaft 37 will effect adjustment of the saw slot 38. Preferably the table member 32 is provided with a downwardly extending flange 40 forming one marginal edge of the slot 38 and the table member 34 is also provided with a dependent flange 41.

A carriage supporting and guide structure generally designated as 42 is disposed beneath the table member 31 and comprises a pair of substantially triangular end plate members 43 which are pivotally mounted on trunnions or pivot members 44 carried by the angle members 23 and 24. A pair of parallel carriage guide rails 45 are secured as at 46 to the end plates 43 and in practice these guide rails 45 are round in transverse section. Each end plate 43 at its upper portion is provided with a toothed quadrant 47 and a worm 48 carried by a counter-shaft 49 is adapted to mesh with the teeth of the quadrant or worm gear 47. See Fig. 4. The counter-shaft 49 is rotatably mounted in bearings 50 and 51 which are fixed to the end members 23 and 24, and the outer end of each counter-shaft 49 is provided with an annular worm gear 52 which meshes with a driving worm 53 carried by a driving shaft 54.

The driving shaft 54 is rotatably carried by a bearing bracket structure 55 secured to the angle members 23 and 24, and a crank 56 is carried by one end of the shaft 54. In practice there are two of the shafts 49 and two worms 53 meshing with the two worm gears 52. A pointer 57 is fixed to the trunnion 44 on the outer side of the frame structure and an index plate 57a is provided with graduations 58 so that when the carriage supporting and guiding structure comprising the plates 43 and the guide members 45 is angularly adjusted, the angle of adjustment can be accurately determined by the position of the pointer 57 relative to the indicia 58.

A movable carriage generally designated as 59 is movably mounted on the guide rails 45 and comprises a body 60 (Fig. 3) which on one side thereof is provided with a pair of lower rollers 61 and a pair of upper rollers 62. The rollers 61 and 62 have grooved peripheries so that one of the guide rails 45 may be engaged therebetween. The other side of the body 60 is provided with a pair of lower rollers 63 and a pair of upper rollers 64. The upper rollers 64 are preferably carried by an obtusely angled supporting arm 65 so that the axes of the upper rollers 64 will be disposed at a substantially acute angle with respect to the axes of the rollers 63. The provision of the angularly disposed roller 64 is for the purpose of supporting the carriage 59 from the guide rails 45 when the carriage supporting structure 42 is disposed in a position out of the normal.

The body 60 is also provided with an upwardly directed arm 66 through which a threaded carriage locking member 67 engages. The locking member 67 is adapted to engage a rail 45 so as to hold the carriage 59 against movement lengthwise of the rails 45. A spindle housing or bearing member 68 is disposed above the carriage 59 and is supported relative to the carriage 59 by means of a pair of vertically disposed guide or supporting members 69 which are secured at their upper ends in laterally projecting bosses 70 carried by the spindle housing 68. There are two of these laterally disposed bosses 70, one on each side of the spindle housing 68 and one boss 70 is disposed adjacent one end of the spindle housing 68 whereas the other boss 70 is disposed adjacent the opposite end of the spindle housing 68. (See Fig. 5.)

The spindle supporting members 69 slidably engage through a pair of sleeves 71 which are carried by the carriage body 60 and the lower ends of the supporting members 69 project below the carriage 59 and engage in bushings or bosses 72 carried by a power member supporting plate or base 73. The supporting members 69 may be secured in the bosses or bushings 72 in any suitable manner.

A threaded shaft 74 is fixed at its upper end to the spindle housing 68 and projects downwardly through the body 60. A rotatable nut member 75 threadably engages the shaft 74 and this nut member 75 is provided with a beveled gear 76 which meshes with a beveled gear 77 carried by a spindle adjusting shaft 78. See Fig. 6. The shaft 78 is journalled in a bearing 79 forming part of the carriage body 60. The nut 75 is held against endwise movement by means of a plate or securing member 80 which engages the upper end of the nut 75. In this manner the gear 76 is held in meshing engagement with the gear 77.

A crank shaft 81 is connected by means of a hinged joint 82 to the shaft 78 so that during the normal operation of the saw structure, the spindle adjusting shaft or crank 81 may be disposed in a vertical inoperative position which is the position shown in Figure 1. When it is desired to vertically adjust the spindle housing 68 so as to raise or lower the saw 83 carried by a spindle 84 rotatably mounted in the spindle housing 68, the crank member 81 is raised to a substantially horizontal position with the carriage 59 at the forward end of the supporting frame structure. The spindle 84 is provided at the end thereof opposite from the saw 83 with a pulley 85 which is provided with a V-shaped groove and an endless belt or flexible drive member 86 is trained over the pulley 85. A driving pulley 87 is carried by a motor shaft 88 and a motor or power member 89 is fixed in any suitable manner to the power member supporting plate or base 73. In the present instance, the motor 89 is dependently secured to the base plate 73.

A combined carriage operating and saw guarding structure generally designated as 90 is secured to the spindle housing 68 and includes a horizontally disposed rod 91 fixed at one end to the housing 68 and projecting rearwardly therefrom. See Fig. 6. A laterally propecting arm 92 (Fig. 5) is provided with a boss 93 within which the rod 91 is received and the arm 92 is adjustable lengthwise of the supporting member 91 by means of a set screw 94 engaging through the boss 93. A reduced stud 95 is carried by the supporting arm 92 and a clamping nut 96 is threaded onto the stud 95. A vertically disposed supporting member 97 is provided with an elongated slot 98 within which the stud 95 is received and supporting member 97 is adjusted vertically by means of the clamping nut 96. The supporting member 97 projects vertically and upwardly through the saw slot 38 and a guard member 99 substantially U-shaped in cross section which is provided with a pair of rearwardly projecting ears 100 is fixed by fastening devices 101 to the upper end of the supporting member 97.

This supporting member 97 not only supports the guard 99 above the saw 83 but also constitutes a wood splitting member which is adapted to follow the saw 83 so as to prevent the wood from pinching the saw as the saw moves through the wood. The guard member 99 has the parallel legs 102 thereof disposed on opposite sides of the saw 83 and the bight 103 thereof is disposed over the top of the saw 83. See Fig. 3. A handle 104 is fixed to and extends upwardly from the bight 103 and provides a means whereby the carriage 59 with the saw 83 may be moved lengthwise of the saw slot 38.

The frame structure is provided at each end thereof with a pair of handles 129 and 130 which are secured to the vertical posts 16 and 17 and project forwardly of the posts 16 and rearwardly of the posts 17. The handles 129 and 130 provide a means whereby the entire saw structure may be shifted from one point to another.

In the use and operation of this device, if it is desired to cut wood which is of a greater length than the width of the table 31, table extensions may be secured on the ledges 29 and 30. These extensions may be either secured to the horizontal sides 29 and 30 of the angle members 25 and 26, respectively, or may rest on these horizontal sides at their inner ends and be supported at the outer ends by other supporting means (not shown). The motor 89 is connected to a suitable source of power supply and it will be undertsood that a switch may be connected to the motor 89 and this switch secured to any suitable point on the frame structure.

The portable power driven structure hereinbefore described has been designed for the purpose of facilitating the cutting of wood particularly during building operations where it is necessary to cut the wood in various lengths and make various kinds of cuts in the wood and at the same time, the saw structure hereinbefore described may be shifted from one point to another so that it will be located at the most convenient point. While the saw member 83 is herein disclosed as operated from a motor, it will be understood that any suitable power means such as an internal combustion engine may be substituted for the motor 89. An example of an internal combustion engine used as a power member is disclosed in my prior application.

What I claim is:

1. In a portable saw structure of the type including a frame having a saw table, an adjustable saw slot extending across said table, a reciprocating carriage, a rotary saw carried by said carriage and means for rotating the saw; means for adjusting said saw comprising a spaced apart pair of substantially triangular end plates disposed immediately adjacent the ends of the frame, a pivot for pivotally mounting the upper points of the plates to the underside of said table offset from said saw slot, a pair of track members extending between said plates and secured to the lower points thereof, a spaced apart pair of arcuate gear segments secured to said pivot member supporting said plates adjacent the opposite ends thereof closely adjacent said plates with the gear edge directed downwardly, drive means engageable with the teeth of each of said gear segments, drive means connecting said teeth engaging means and adapted to move said gear segments simultaneously in the same direction whereby said saw is tilted with respect to said table, and means carried by said carriage for vertically adjusting said saw with respect to said carriage and said saw table.

2. In a portable saw comprising a frame, a slotted saw table on said frame and angularly adjustable saw suspension means, a saw and driving means beneath said table, said suspension means comprising a pair of triangular-shaped end plates immediately within the ends of said frame, a supporting shaft fixed to said plates and rockably carried by said frame below said table, segmental worm gears fixed to said shaft adjacent said plates, a pair of worm shafts rotatably carried by said frame, a worm on each worm shaft meshing with sad worm gear, a common driving shaft for said worm shafts, and a spaced apart pair of parallel guide tracks fixed to the lower portion of said plates for supporting said saw and said saw driving means for longitudinal movement with respect to said table.

3. In a portable saw comprising a frame, a slotted saw table on said frame and angularly adjustable saw suspension means, a saw and saw driving means beneath said table, said suspension means comprising a pair of triangularly-shaped end plates immediately adjacent the ends of said frame, a supporting shaft fixed to said plates and rockably carried by said frame below said table, segmental worm gears fixed to said shaft adjacent said plates, a pair of worm shafts rotatably carried by said frame, a worm on one end of said worm shaft meshing with said worm gear, a worm gear on the opposite end of said worm shaft, a common driving shaft for said worm shafts, worms on said common driving shaft meshing with said latter worm gears, and a spaced apart pair of parallel guide tracks fixed to the lower portion of said plates for supporting said saw and said saw driving means for longitudinal movement with respect to said table.

GILBERT J. SELLMEYER.